United States Patent Office 2,845,442
Patented July 29, 1958

2,845,442

PRODUCTION OF 1.2-EPOXYCYCLO-OCTANE USING IN SITU PERFORMIC ACID

Heinz Pachaly and Otto Schlichting, Ludwigshafen (Rhine), Germany, assignors to Badische Anilin- & Soda-Fabrik Aktiengesellschaft, Ludwigshafen (Rhine), Germany No Drawing. Application December 21, 1955
Serial No. 554,398

Claims priority, application Germany January 8, 1955

1 Claim. (Cl. 260—348.5)

This invention relates to an improved process for the production of 1.2-epoxycyclo-octane.

Two methods have hitherto been known for the conversion of cyclo-octene into 1.2-epoxycyclo-octane. The first consists in allowing benzo peracid to act on cyclo-octene (cf. Godchot and others, Comptes rendus, 192 (1931), 262, and W. Reppe and others, Liebigs Ann. Chem., 560 (1948), 40). It is relatively expensive and is not suitable for operation on an industrial scale. The second makes use of peracetic acid, which is cheaper, instead of benzo peracid (cf. Craig, U. S. patent specification No. 2,571,208, and Cope and others, J. Amer. Chem. Soc., 74 (1952), 5884); it necessitates however a troublesome working up with the use of large amounts of solvent and extraction agent.

It has already been proposed (cf. Cope and others, ibid.), to react cyclo-octene with performic acid in the presence of so large an excess of formic acid that a homogeneous solution is formed. In this way, however, the epoxide ring first formed is immediately split to yield the formic acid esters of cyclo-octane-1.2- and 1.4-diols. Closer investigation of this reaction showed that considerable amounts of other products are also formed. In any case the desired 1.2-epoxycyclo-octane cannot be obtained in satisfactory yields by this method.

We have now found that 1.2-epoxycyclo-octane is obtained in very good yields by treating cyclo-octene at room or slightly raised temperature, for instance at from about 15° to about 60° C. with a slight excess, for instance 1.05 to 2 mols, of aqueous hydrogen peroxide solution and such amounts of formic acid that will not be sufficient to form a homogeneous solution with the mixture of the other reactants. It is preferable to use about 0.3 to 2 mols of formic acid (with reference to the amount of cyclo-octene).

By working in this way, the reactants only mix to a slight extent. The speed of reaction of the formation of the epoxide is, however, scarcely impaired, whereas the splitting of the epoxide thus formed is prevented so extensively that the epoxide is practically the sole reaction product.

The working up of the reaction mixture is very simple; the layers are separated, the upper layer washed with water and caustic alkali solution and if necessary with alkali metal bisulfite solution and then subjected to fractional distillation by which first some unreacted cyclo-octene is recovered which can be used again. The aqueous layer, which, besides formic acid and unreacted hydrogen peroxide, contains only small amounts of epoxide, is preferably utilized for reaction with fresh cyclo-octene until the hydrogen peroxide has been completely used up, whereupon the resulting mixture of cyclo-octene and 1.2-epoxycyclo-octane is separated and used in a fresh batch instead of pure cyclo-octene.

The process is preferably carried out on the countercurrent principle, if desired in a plurality of stages, and/or continuously.

The 1.2-epoxycyclo-octane which is conveniently accessible in this way is a valuable intermediate product, especially for pharmaceutical products and plastics.

The following example will further illustrate this invention but the invention is not restricted to this example. The parts are parts by weight.

*Example*

230 parts of concentrated formic acid are allowed to flow while stirring and cooling into a mixture of 1100 parts of cyclo-octene and 1250 parts of a 35% aqueous hydrogen peroxide solution. The whole is stirred for 24 hours further while maintaining a temperature of about 30° C. The upper layer is then separated and washed with water, dilute caustic soda solution and bisulfite solution. If it should thereby solidify, it can be liquefied by gentle heating or by the addition of a small amount of an indifferent solvent, such as hydrocarbons or chlorohydrocarbons, with which the aqueous layer has preferably been shaken. The unconverted cyclo-octene is then distilled off over a column (140 parts) and can be reacted again. The residue (1028 parts) has the melting point 48° to 52° C. and consists essentially of 1.2-epoxy-cyclo-octane which is already sufficiently pure for most purposes of use. By fractional distillation at reduced pressure there are obtained therefrom 957 parts (87% of the theoretical yield with reference to the cyclo-octene reacted) of pure 1.2-epoxycyclo-octane of the boiling point 82.5° C. at 22 torr and the melting point 57.3° to 57.8° C.

What we claim is:

An improved process for the production of 1,2-epoxy-cyclo-octane which comprises adding from about 0.3 to 2 mols of formic acid at about 15° to 60° C. to a mixture of one mol of cyclo-octene and about 1.05 to 2 mols of aqueous hydrogen peroxide, separating the layers, washing the upper layer with water and caustic alkali solution and fractionally distillating the remaining layer.

References Cited in the file of this patent

UNITED STATES PATENTS

| | | |
|---|---|---|
| 2,485,160 | Niederhauser | Oct. 18, 1949 |
| 2,500,599 | Bergsteinsson | Mar. 14, 1950 |
| 2,543,419 | Niederhauser | Feb. 27, 1951 |
| 2,571,208 | Craig | Oct. 16, 1951 |